United States Patent [19]

Wong

[11] Patent Number: 4,586,174
[45] Date of Patent: Apr. 29, 1986

[54] AUDIO CHANNEL STACKING WITH SPEECH COMPRESSION FOR NARROW BAND TRANSMISSION WITH PROVISION FOR DIALED CALLS

[75] Inventor: Stephen Wong, Alameda, Calif.

[73] Assignee: The Variable Speech Control Company ("VSC"), San Francisco, Calif.

[21] Appl. No.: 646,501

[22] PCT Filed: Aug. 14, 1984

[86] PCT No.: PCT/US84/01315
§ 371 Date: Aug. 14, 1984
§ 102(e) Date: Aug. 14, 1984

[87] PCT Pub. No.: WO85/00903
PCT Pub. Date: Feb. 28, 1985

Related U.S. Application Data

[63] Continuation-in-part of Ser. No. 523,702, Aug. 16, 1983, abandoned.

[51] Int. Cl.⁴ .......................... H04J 1/00; H04J 15/00
[52] U.S. Cl. .................................. 370/69.1; 370/118; 370/120; 381/29
[58] Field of Search .................. 455/72; 375/122; 370/69.1, 109, 118, 120; 381/2, 29–33; 358/134, 142, 258, 260, 133

[56] References Cited

U.S. PATENT DOCUMENTS

| | | | |
|---|---|---|---|
| 2,270,385 | 1/1942 | Skillman | 370/69.1 |
| 3,259,692 | 7/1966 | Aspinwall | 370/69.1 |
| 3,349,184 | 10/1967 | Morgan | 381/29 |
| 3,505,479 | 4/1970 | Hodge | 370/69.1 |
| 4,071,707 | 1/1978 | Graf et al. | 370/118 |

FOREIGN PATENT DOCUMENTS 2437152  2/1975  Fed. Rep. of Germany .

Primary Examiner—Joseph A. Orsino, Jr.
Attorney, Agent, or Firm—Charles E. Pfund

[57] ABSTRACT

An analog signal stacking method and apparatus permits transmission of n analog signals of given spectrum width over a narrow band communication circuit having bandwidth approximately equal to the spectrum width of one analog signal by compressing the spectrum of each signal by a factor of 1/n and frequency offsetting the compressed signals to occupy contiguous frequency bands within the bandwidth of the circuit. Received signals are processed to remove the frequency offset and expand the baseband signals to restore each analog signal to its normal spectrum. A dial through circuit permits application of the stacking feature to place two conventional dialed calls on a single line of the telephone network using a circuit for processing both dial and voice signals.

6 Claims, 11 Drawing Figures

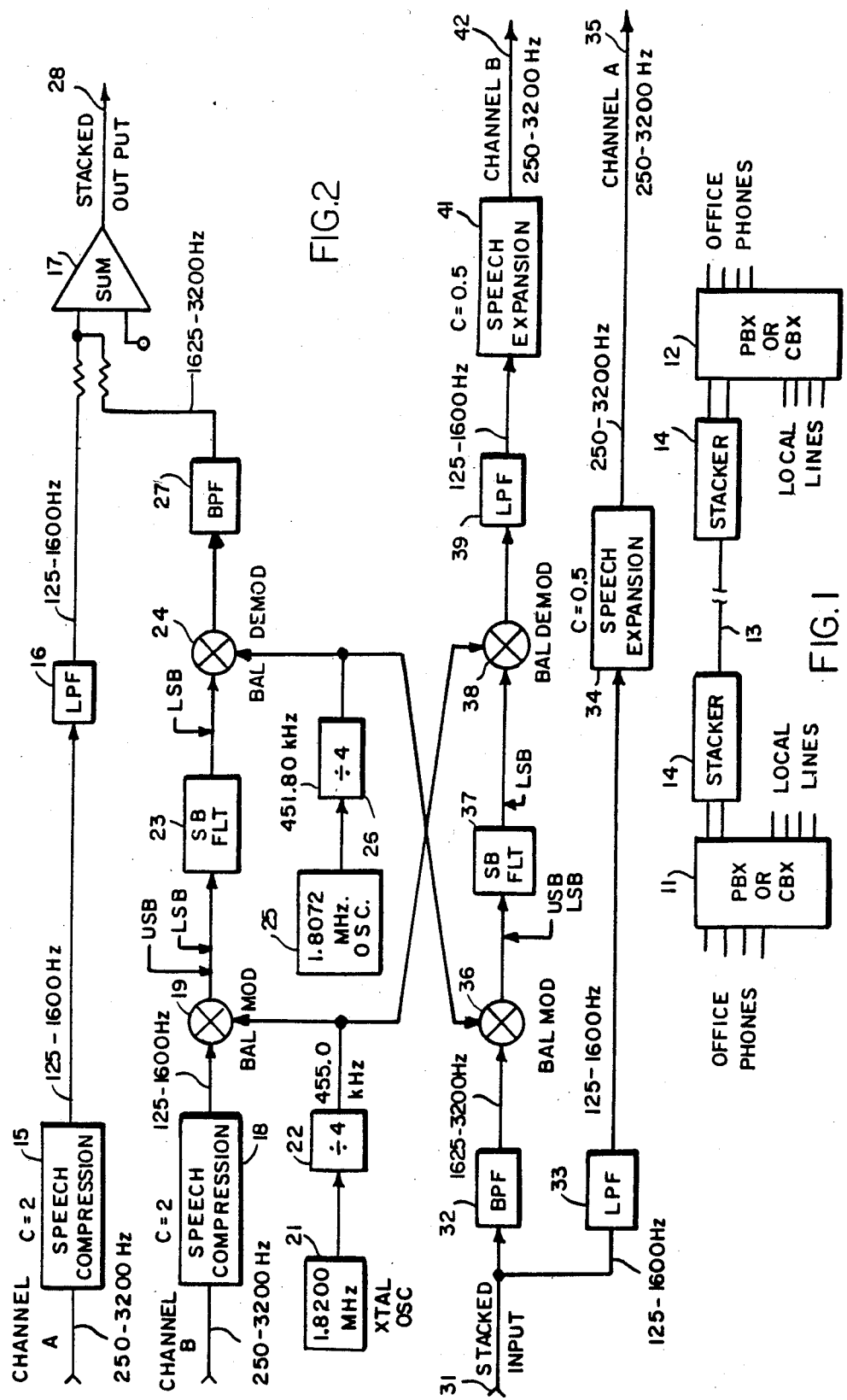

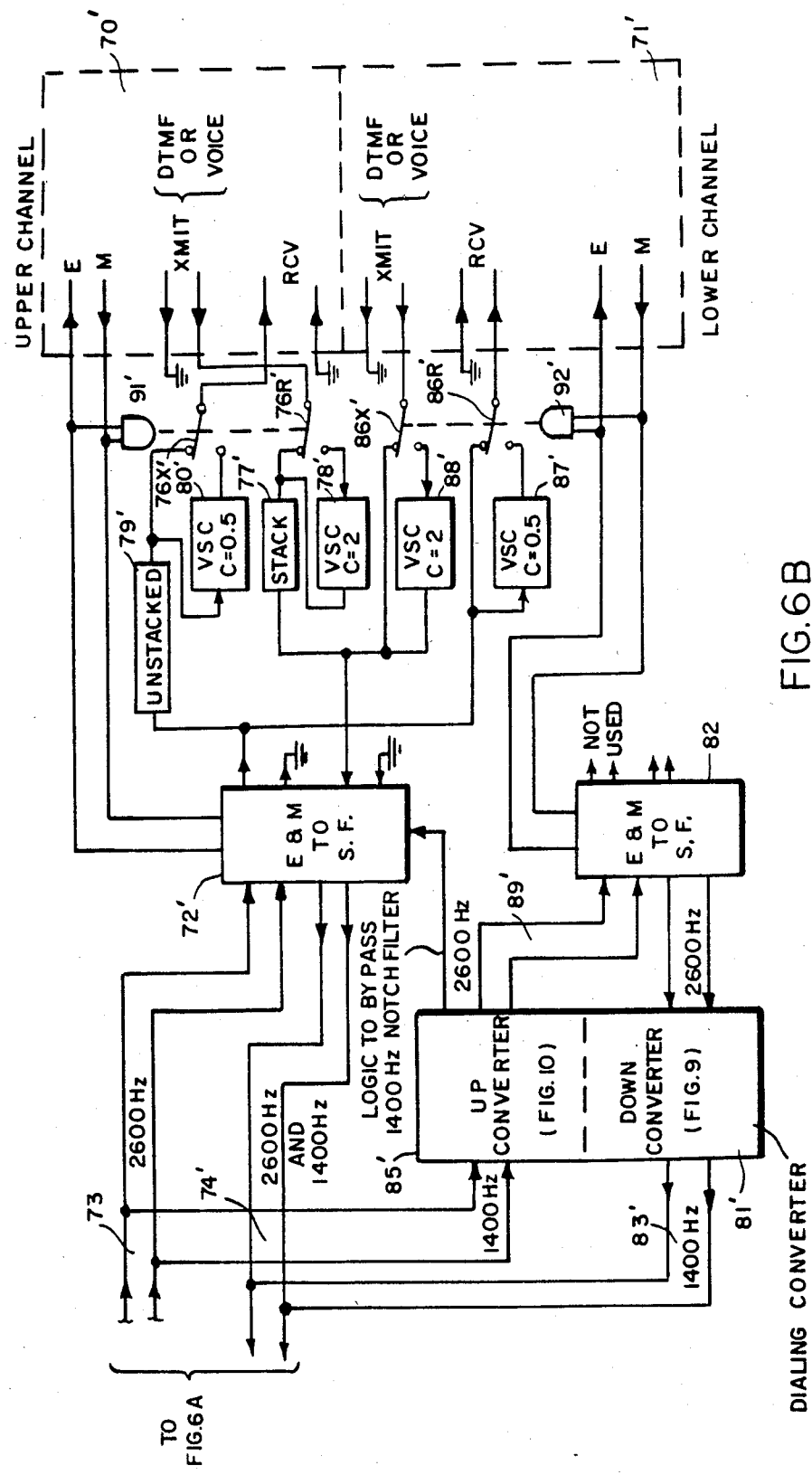

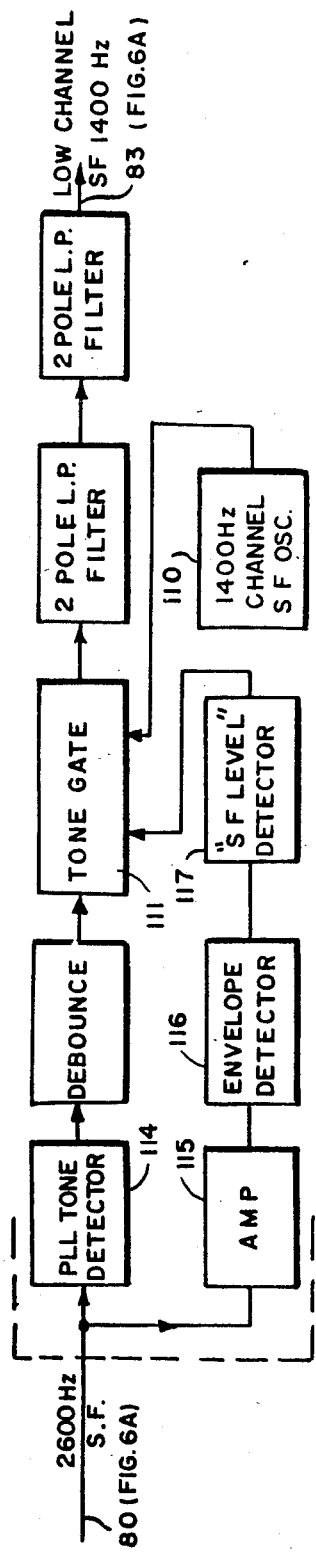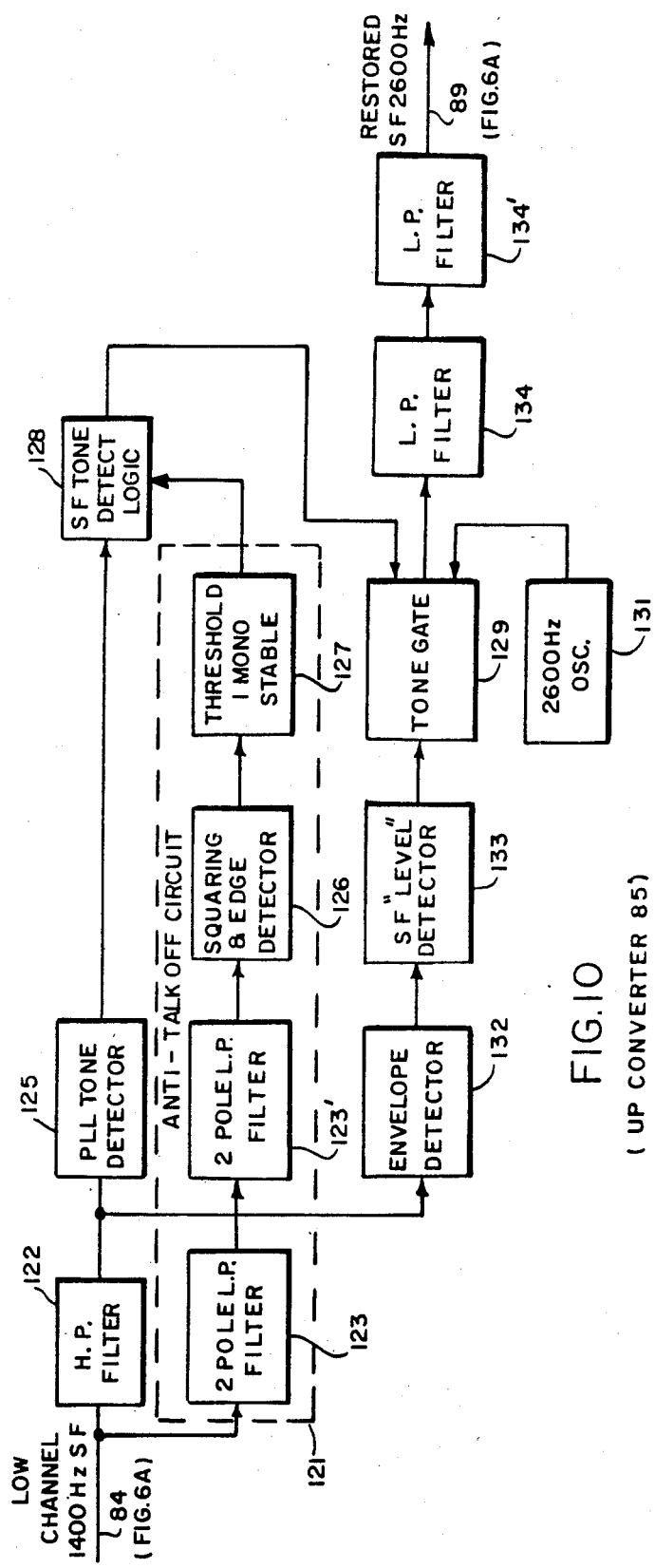
FIG. 9 (DOWN CONVERTER)
FIG. 10 (UP CONVERTER 85)

AUDIO CHANNEL STACKING WITH SPEECH COMPRESSION FOR NARROW BAND TRANSMISSION WITH PROVISION FOR DIALED CALLS

This is a continuation-in-part of U.S. Ser. No. 523,702, filed Aug. 16, 1983, now abandoned.

BACKGROUND OF THE INVENTION

This invention relates to communication systems for sending information by transmission between stations over a limited band circuit such as, for example, a telephone line or telephone voice grade circuit. The invention provides for sending a plurality of separate messages each of which may occupy the available known bandwidth under normal conditions but by means of the present invention a plurality of such messages can be sent over a communication circuit which has a bandwidth approximately the same as that of the individual messages. In particular the invention is adapted to send a plurality of telephone voice messages over an ordinary dialed telephone line or circuit which has approximately a 3 kHz bandwidth.

There exist presently various digitized voice transmission systems which increase line utilization by data sample rates of 4800 baud for two simultaneous voice channels on a 9600 baud private line, but such systems involve substantial digital computer capability with the resultant high cost and impairment in quality of the voice signal, particularly with regard to speaker recognition.

Analog voice multiplexing is also employed for increasing communication line utilization through a technique known as Time Assigned Speech Interpolation (TASI) in which the various conversations are analyzed to insert the multiple messages for one channel in the gaps during pauses and between words found in the other messages. Generally this manipulation is done in digital form with the result reconverted to analog for transmission, thereby eliminating the need for modems or data sets. These systems require substantial data processing power and hence only become economically feasible when a large number of lines are processed.

Bandwidth reduction by speech compression in real time has been suggested for telephone line transmission as shown, for example, in the patent to French et al., U.S. Pat. No. 1,671,151. Such systems transform the original voice frequencies into a narrower spectrum thus permitting their transmission over a narrow band circuit.

Other arrangements for reducing the required bandwidth of the transmission circuit for voice signals employ a modulation and frequency offset demodulation technique to transfer a portion of the voice spectrum to a different portion of the speech band. In these schemes two or more portions of the speech spectrum are frequency offset to occupy the portion of the spectrum ordinarily occupied by a fractional part of the speech spectrum and these signals are sampled at an adequate rate and multiplexed in time before summing so that they can be applied to a narrowband transmission line and received by time demultiplexing. An example of such systems is found in the patent to Franco, U.S. Pat. No. 3,116,374, which uses multiplexing related to the number of subdivisions of the incoming signal spectrum. The patent to Harris et al., U.S. Pat. No. 4,314,104, utilizes what is termed the inherent time division multiplex character of the voice signal to accomplish a similar result. The patent to Morgan, U.S. Pat. No. 3,349,184, shows an arrangement for bandwidth compression and expansion by frequency division and multiplication and in connection with FIGS. 20–22 thereof discloses a five channel system with the subchannels proportioned to occupy a 3 kHz transmission bandwidth.

SUMMARY OF THE INVENTION

The present invention provides for frequency band stacking of multiple analog signals utilizing speech compression and expansion and includes arrangements which permit telephone dialing to establish dialed up circuits for simultaneous telephone calls on a single voice circuit.

To obtain a plurality of signal channels each message signal is compressed for transforming the signal to a fractional portion of its normal spectrum. In one channel the compressed baseband signal can be directly passed to a summing unit. The remaining channels have the compressed signal applied to introduce frequency offset, such as by modulating the information signal on a carrier and extracting the suppressed carrier sideband information signal which is then demodulated at an offset frequency before being applied to the summing device. In this fashion a plurality of information signals such as a plurality of voice messages, each of which originally had a spectrum approximately equal to the bandwidth of the communication circuit to be employed for transmission, can be reduced in frequency by a factor equal to the number of channels to be transmitted, and those reduced frequency information signals can be stacked in contiguous bands to occupy the bandwidth of the transmission circuit. By providing a reciprocal relationship for signals received from the transmission circuit, the contiguous frequency band signals can be separated by appropriate filters and the offset frequency signals transfered to occupy baseband or other normal position in the spectrum before the signals are passed through speech expansion means for restoring each signal to its normal frequency spectrum on its individual output terminal.

Accordingly it is the principal object of the present invention to provide an improved simple and economical system which permits multiple channel analog signals to be transmitted over a narrowband communication circuit without the requirement for digital processing or computer capability while maintaining high quality two-way communication for the multiple channels over a single circuit between the transmitting and receiving points. When used for telephone signals the system maintains voice quality reception for normal conversation and voice recognition while multiplying the number of voice channels available over each voice grade circuit and permits normal dialing to establish the desired circuit connection.

DESCRIPTION OF THE DRAWINGS

FIG. 1 is a block diagram showing a typical application of the invention to double line capacity in a dedicated or private line system, or a dial selected circuit connection.

FIG. 2 is a block diagram of a compression-stacker-expander as used in the system of FIG. 1 providing two-channel capacity over a single two-way circuit for two-way conversations on both channels.

FIGS. 6A and 6B, assembled as indicated, are a block diagram of a system with provision for dial-through connection on the dial telephone network with stacking of two simultaneous two-way messages on a single trunk line.

FIG. 9 is a block diagram of the down-converter used in FIG. 6.

FIG. 10 is a block diagram of the up-converter used in the system of FIG. 6.

DETAILED DESCRIPTION OF THE PREFERRED EMBODIMENT

Figure 3:
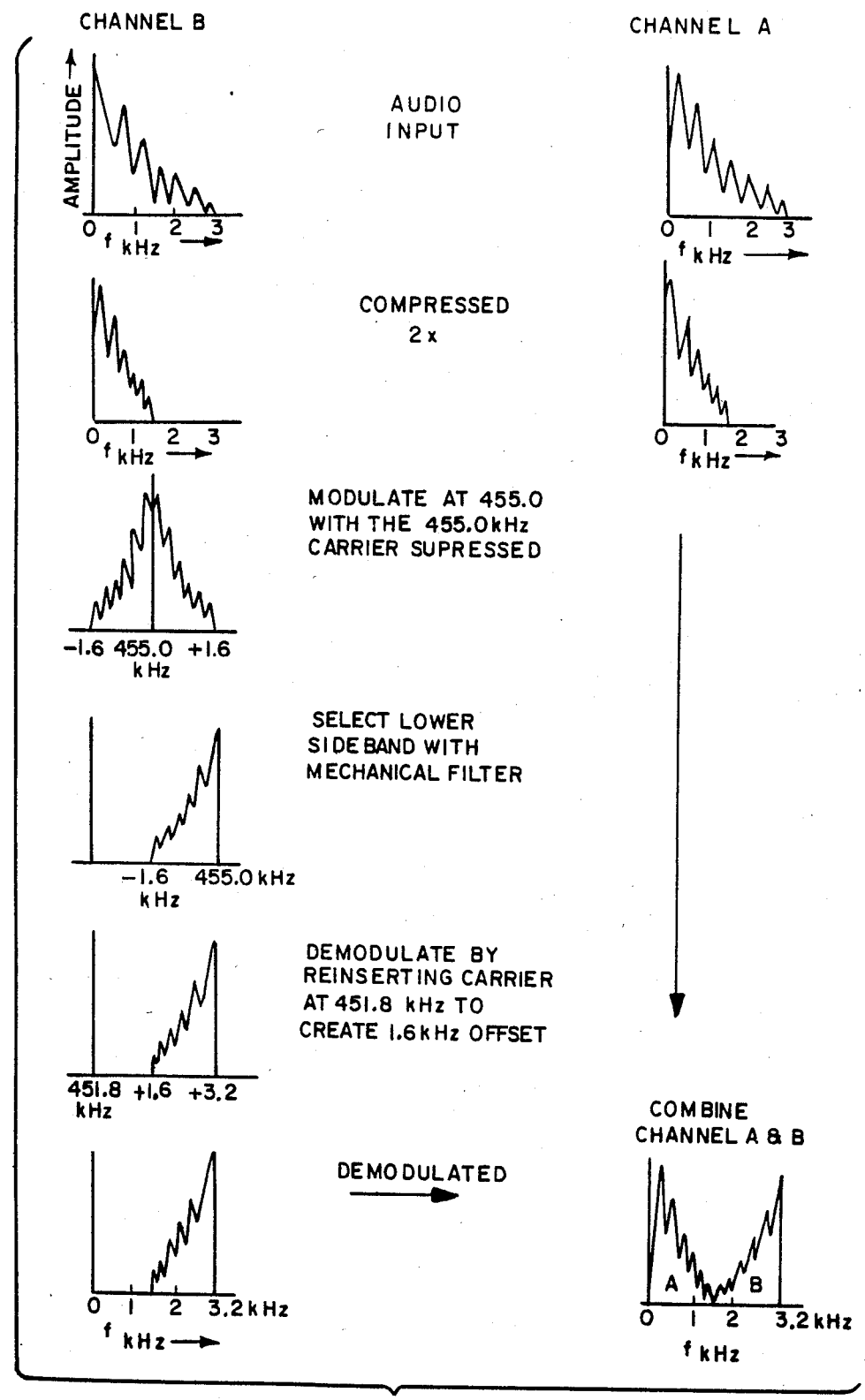
FIG. 3 shows the analog spectrum for a two-channel system at various stages as the signal is processed for transmission through a system of the type shown in FIG. 2.

Referring now to FIG. 1 the overall application of the invention to provide dual channel two-way communication between remote stations on a typical single narrowband line will be described. As shown in FIG. 1 ordinary PBX or CBX stations 11 and 12 represent existing telephone equipment servicing a plurality of office telephones and local lines. To interconnect the remote stations 11 and 12 a single dedicated or dialed line 13 is provided to interconnect the two. Interposed between the local terminals 11 and 12 and the interconnecting long distance line 13 are stacker units 14 constructed in accordance with the invention. Each stacker 14 handles two lines from telephone sets in its respective PBX and processes both of its lines for both incoming and outgoing messages on line 13, thereby doubling the capacity of line 13, as will be described.

Referring now to FIG. 2 a stacker 14 of the type used in the system of FIG. 1 will be described. The system of the invention utilizes devices which are capable of compression and expansion of audio analog signals. In describing such elements of the invention the nomenclature of the patent to Schiffman, U.S. Pat. No. 3,786,195, will be used. In that patent a system for fast or slow playback of recorded speech is disclosed with speech compression and expansion units used to convert the spectrum of the speech signal into its normal frequency band.

In the present invention speech compression and expansion are utilized in real time and the various known forms of such frequency transformation of analog signals, such as those disclosed in the Schiffman patent and subsequent patents of the assignee, the Variable Speech Control Company, can be utilized. In the nomenclature used, speech compression consists of reducing the frequency of an incoming signal by a factor $1/c$, where c has a value greater than 1. Speech expansion is defined as transforming the spectrum of an incoming speech signal to increase the frequency by a factor $1/c$, where c has values greater than 0 but less than 1. Thus speech compression at a factor of $c=2$ will reduce the speech spectrum to occupy one half the bandwidth and have frequency values one half those of the original signal. Similarly, speech expansion with a factor of $c=0.5$ will increase an incoming signal spectrum to double its width at twice the incoming frequency.

In FIG. 2 a system for handling two channels A and B is shown. The number of channels dictates the factor c, so for two channels $c=2$, and a speech compression unit 15 reduces the normal incoming speech spectrum of 250-3200 Hz to an output of 125-1600 Hz. A lowpass filter 16 having this characteristic passes the compressed channel A signal to one input of a summing device 17.

The second channel, channel B, is applied to a similar speech compression unit 18, the output of which is at half frequency and half spectrum width at 125-1600 Hz, which signal is applied as one input to a balanced modulator 19. The other input to the balanced modulator 19 is a carrier frequency, for example 455.0 kHz, obtained from a suitable source such as oscillator 21 and divider 22.

The output of balanced modulator 19 contains upper and lower sidebands which when applied to a sideband filter 23 produce as an output signal the suppressed carrier lower sideband at (455.0−1.6) kHz which is applied to a balanced demodulator 24. The second input to demodulator 24 is the offset carrier at 451.8 kHz derived from an oscillator 25 and divider 26. The output of the demodulator 24 is applied to a bandpass filter 27 having a passband of 1625-3200 Hz and this signal is applied as another input to the summing circuit 17.

Thus at an output terminal 28 the summing circuit 17 supplies the channel A signal compressed to half spectrum width and occupying the band from 125 to 1600 Hz while the signal of channel B is compressed to one half its spectrum width and occupies the band from 1625 to 3200 Hz.

The operation of the portion of FIG. 2 just described can be further understood with reference to FIG. 3 which shows the spectrum of the analog speech signal at various points as it is subject to frequency transformation. In FIG. 3 the column entitled "Channel A" shows audio input as covering the spectrum from 250 to 3200 Hz which when compressed by a factor of 2 occupies the spectrum from 125 to 1600 Hz. That same signal after filtering in filter 16 appears as the channel A portion of the combined output in FIG. 3.

In the column for channel B in FIG. 3 the original and compressed spectrum signals appear the same as those in channel A. When the 1600 Hz compressed speech signal is modulated on the 455.0 kHz carrier the double sideband signal centered at 455.0 kHz is obtained, and the lower sideband is selected by filter 23 which may be sharply tuned mechanical filter.

The demodulation in demodulator 24 is with respect to a carrier frequency of 451.8 kHz which has the effect of moving the selected lower sideband spectrum higher by 1.6 kHz, thereby creating a spectrum component which is offset by that amount to occupy the spectrum from 1.6 to 3.2 kHz. This is the signal that appears at the output of bandpass filter 27, and, when applied to the summing circuit 17, produces the B component of the combined channel A and B signals on terminal 28.

Thus from FIG. 3 it can be seen that each of the original audio input signals which both occupy the 3 kHz band of the available telephone line or other communication circuit have been compressed to occupy one half of that spectrum and one of the channels has been offset by an amount equal to one half the band so that the two can be transmitted simultaneously, each occupying a contiguous half of the available bandwidth.

Stacked channel A and B signals of the type just described, when transmitted from terminal 28 of FIG. 2 to a telephone line, are received at a remote receiving station at an input terminal 31, as shown in FIG. 2, where the contiguous frequency bands are separated by a bandpass filter 32, operating at the upper half of the band, and a lowpass filter 33 passing signals in the lower half of the band. The lower band signals from the filter 33 are applied to a speech expansion unit 34 which converts the 125–1600 Hz input signal to a full spectrum 250–3200 Hz voice audio signal. For this purpose the speech expander 34 is operating with the factor $c=0.5$.

The output of bandpass filter 32 is the upper half spectrum of the transmitted signal occupying the band from 1625–3200 Hz and this signal is applied as one input to a balanced modulator 36. The other input to the balanced modulator 36 is the 451.8 kHz carrier which produces at the output of modulator 36 the upper and lower sidebands centered on this carrier frequency which are applied to a sideband filter 37. The upper sideband is selected by the sharply tuned filter 37, and this sideband is applied as one input to a balanced demodulator 38, the other input of which is the carrier frequency 455.0 kHz. This demodulation process produces at its output a signal component in the band 125–1600 Hz, and this signal band is passed by lowpass filter 39 and applied to a speech expansion unit 41. Speech expander 41 is operating with $c=0.5$ so that it produces an output full spectrum signal from 250–3200 Hz at its output terminal 42. Thus the full spectrum signal of channel A is recovered on output terminal 35 as previously described and the full spectrum output signal of channel B is recovered at terminal 42 to provide two separate telephone message signals.

Figure 4:
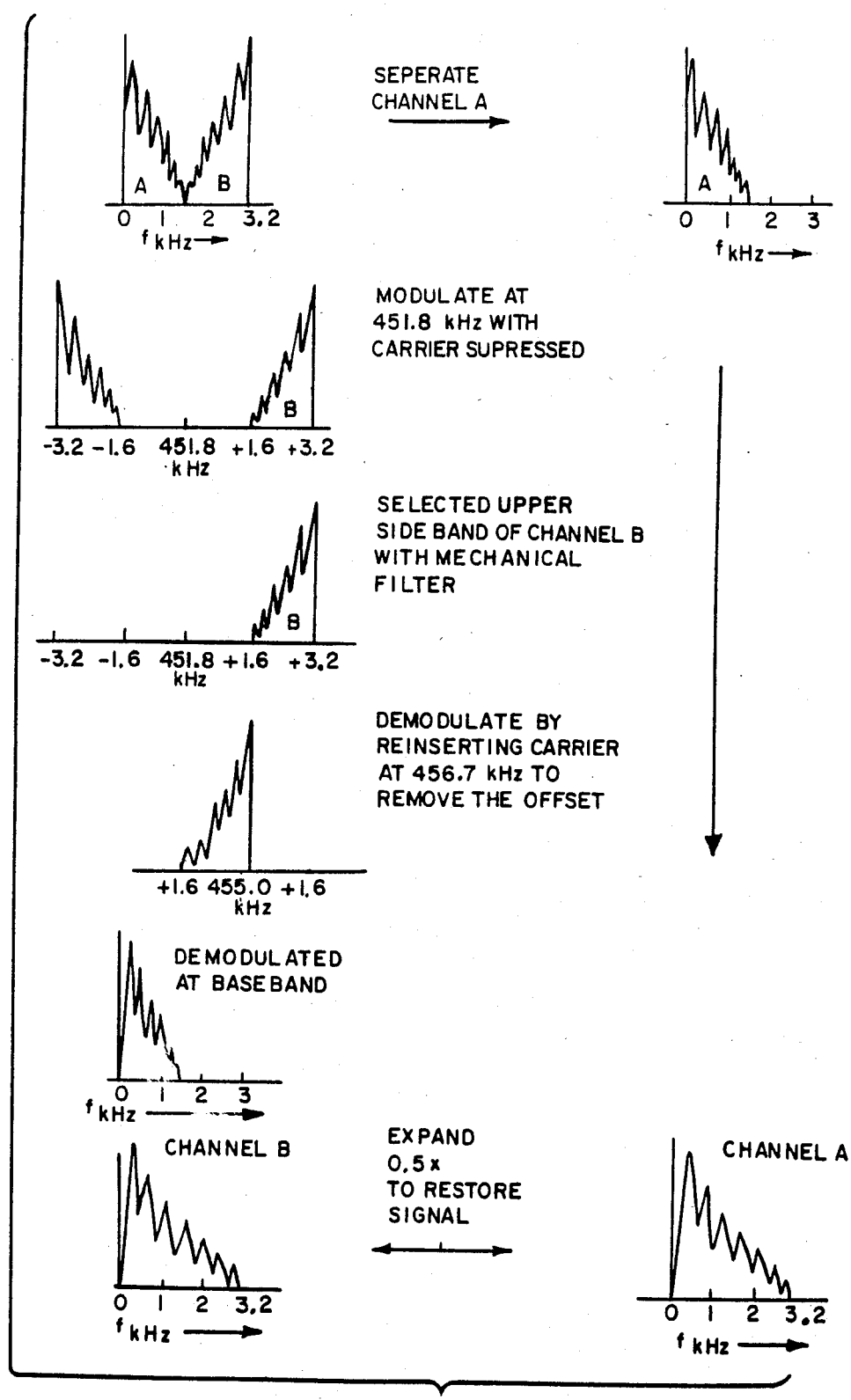
FIG. 4 is a set of spectrum diagrams showing the processing of two channel signals of the type described in FIG. 3 upon reception as they pass through a system of the type shown in FIG. 2.

The reception of the stacked signal bands and their conversion into separate channel A and channel B full spectrum output signals can be further understood with reference to FIG. 4 which shows the spectrum processing through the receiver portion of FIG. 2. As indicated in FIG. 4, stacked A and B spectrum signals are received and by means of the lowpass filter channel A is separated, and after passing through its separate speech expander 34 appears as the full spectrum channel A output signal.

The processing steps to recover channel B from a received signal are also shown in FIG. 4. The bandpass filter 32 separates the channel B spectrum from 1625–3200 Hz and the balanced modulator 36 operating with an injected carrier of 451.8 kHz produces the upper and lower sidebands separated from 451.8 kHz into the spectrum 1.5 to 3.2 kHz above and $-3.2$ to $-1.5$ kHz below the carrier frequency. The sideband filter selects the upper sideband which is above the 451.8 kHz carrier by $+1.5$ to $+3.2$ kHz. This single sideband suppressed carrier signal is then demodulated in demodulator 38 against a 455.0 kHz carrier to produce the compressed channel B signal at baseband from 0 to 1.6 kHz. Passing this signal through a low pass filter 39 and speech expander 41 produces the desired full spectrum channel B signal at 3.2 kHz baseband.

Thus in the system of FIG. 1 if a unit of the type disclosed in FIG. 2 is employed for the stackers 14 shown in FIG. 1 the single telephone line 13 can convey two simultaneous two-way voice frequency messages with excellent voice quality. To accomplish this each of the stackers 14 receives the channel A and B inputs from its PBX 11 or 12, respectively, and supplies its channel A and B outputs to these separate telephone sets or other devices which are using the line. In each case the stacked output terminal 28 and stacked input terminal 31 are connected at the local ends of the voice grade circuit 13.

Figure 5:
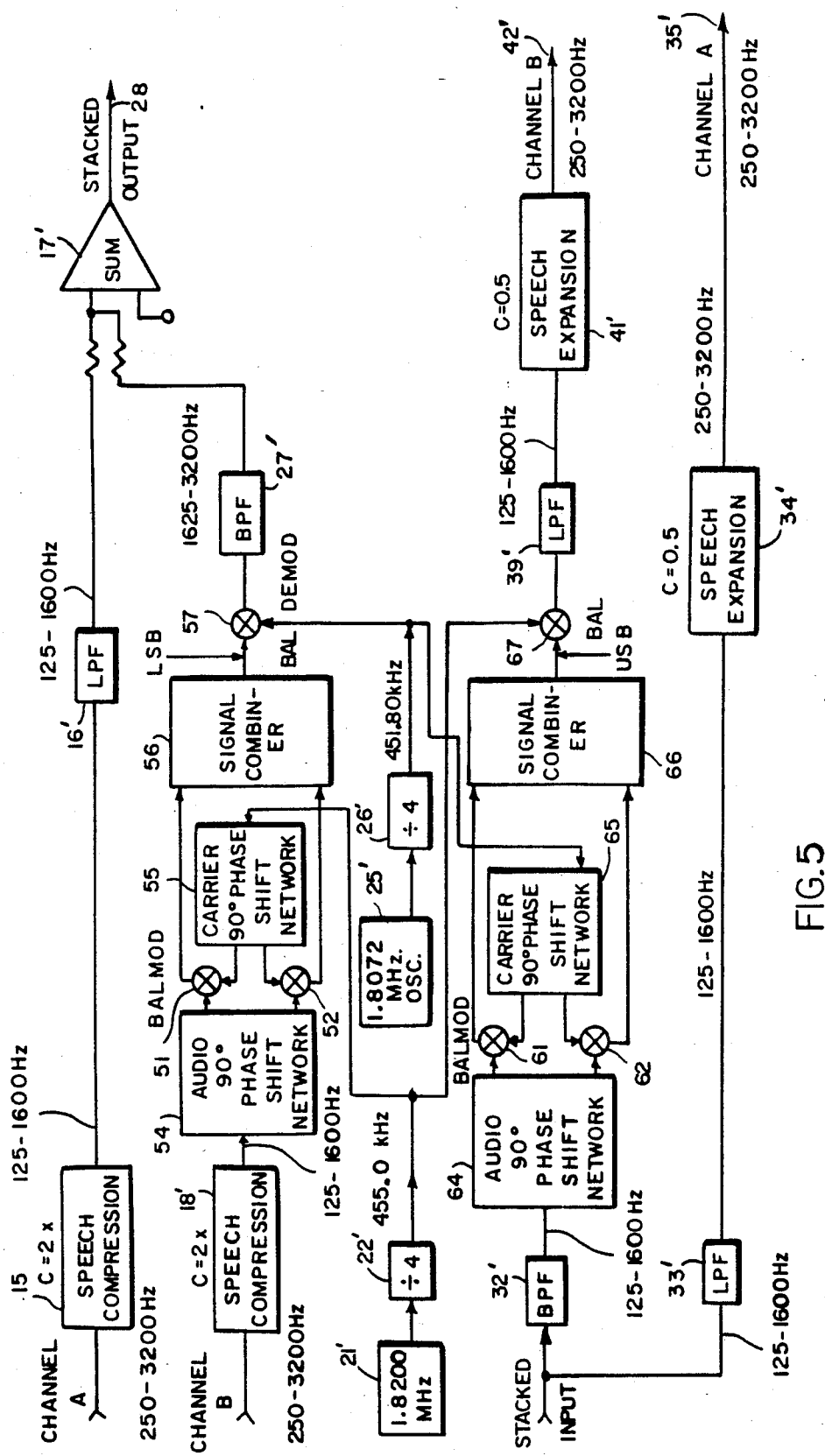
FIG. 5 is a block diagram of an alternative form of frequency offset circuit for use in the system in accordance with the invention.

The invention can be practiced by other means for generating offset sidebands of compressed speech signals. In FIG. 5 a modification is shown wherein a pair of balanced modulators 51 and 52 receive the compressed channel B signal from speech compressor 18 after it passes through an audio 90° phase shift network 54. The 455.0 kHz carrier also passes through a 90° phase shift network 55 before the 455.0 kHz carriers at 90° phase relation are applied respectively to the balanced modulators 51 and 52. The resulting sideband outputs from modulators 51 and 52 are applied to a signal combiner 56 which operates to cancel the upper sideband and enhance the lower sideband so that only the lower sideband signal is applied to a balanced demodulator 57. The upper sideband signal applied to demodulator 57 is demodulated with respect to the 451.8 kHz carrier to recover a demodulated spectrum from 1625–3200 Hz which is selected by bandpass filter 27 and coupled as an input to summing circuit 17.

The remaining portions of the stacking channel for combining channels A and B into a stacked output are the same as those described with reference to FIG. 2 and corresponding elements thereof have the same reference numerals primed.

The recovery of the individual channel A and B signals from a stacked input in the system of FIG. 5 is achieved in an analogous manner to that just described for stacking and again with the components that correspond to those described for FIG. 2 having the same reference numbers primed. The stacked channel A input signal passes through lowpass filter 33' and speech expander 34' to produce the normal spectrum and frequency channel A output at terminal 35'.

The channel B spectrum of the stacked input signal in FIG. 5 is selected by bandpass filter 32' and applied to an audio 90° phase shift network 64 which produces the signal at two outputs with 90° phase relation, which signals are applied respectively to balanced modulators 61 and 62. The balanced modulator 61 and 62 operate with respect to the 451.8 kHz carrier which is applied thereto with 90° phase shift from a carrier phase shift network 65. The outputs of the modulator 61 and 62 are applied to a signal combiner 66 wherein the lower sideband is suppressed and the suppressed carrier upper sideband is enhanced and applied to a balanced demodulator 67. The balanced demodulator 67 has the 455.0 kHz carrier applied thereto which produces the compressed channel B signal at baseband among other components and the baseband signal is selected by lowpass filter 39'. After expansion at $c=0.5$ in expander 41' the full spectrum baseband channel B signal is obtained at output terminal 42'.

Although the invention has been described as applied to voice telephone circuits where two independent voice frequency signals can be accommodated or stacked for transmission over a single voice frequency circuit, the invention is not limited to doubling the narrowband transmission circuit capacity. As is clear from the present disclosure, if the signals are compressed and expanded by a factor of 2 and stacked by frequency offset the two signals propagate through the full bandwidth of the transmission circuit. If three or more message signals are to be transmitted the compression factor c would be correspondingly increased to c=3, 4, etc. Such high compression ratios are available with the technology such as disclosed in the referenced Schiffman patent and related patents which are assigned to the assignee of that patent. In particular, the techniques for speech compression and expansion which are disclosed in the pending U.S. patent application Nos. 500,632 and 500,633 filed June 3, 1983, and assigned to the assignee of the present application, can be employed in the present invention, and when so employed provide extremely high quality speech compression, expansion and reproduction in real time for narrowband transmission. This form of speech compression and expansion is particularly well suited for real time voice circuits since the referenced copending applications control signal processing by detecting the glottal pulse signal derived from the speech signal and achieve a natural splicing between successive samples of the speech signal. In the system of the present invention since splicing of the successive components of the time waveforms occurs in both compression and expansion for each channel at both ends of the transmission line, the natural glottal pulse epoch splicing is of particular advantage.

The invention is not limited to telephone wire line circuits but can be applied to band limited transmission circuits of any type. Although the invention has been described with reference to voice circuits it is not so limited, and can be applied to transmit various analog signal forms without the complexity and expense of digital techniques. The transmission medium may also be radio or other form of radiant energy wherein the system of the type disclosed in FIG. 2 would be interposed to process the audio or analog input signal to deliver the desired stacked messages to the modulator of any conventional communications system. The corresponding unstacking of the demodulated signal at the receiver would produce at the receiver the separate channel signals which were stacked and transmitted.

Figure 6A:
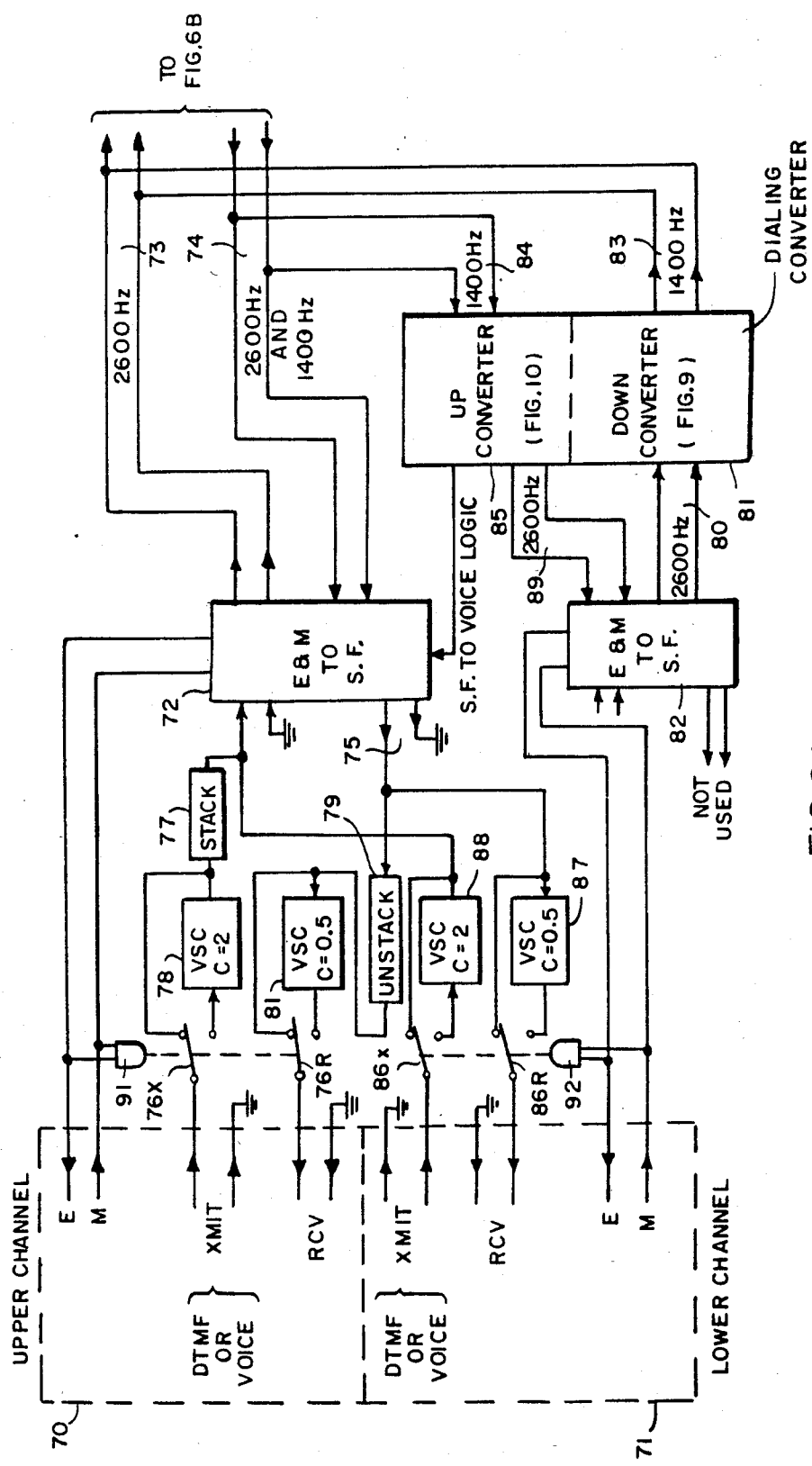

Referring now to FIG. 6A a system terminal for use with a local PBX to double the channel capacity for trunk calls which are dialed in a routine manner is shown. Thus in assigning lines for long distance calls the PBX can assign two calls to a given trunk line and these connections will be made locally to an upper channel unit 70 or a lower channel 71, each of which has connections for the transmission (XMIT) and reception (RCV) of a voice message and the E and M leads for ON HOOK and OFF HOOK signals and impulse dialing. In this description of FIG. 6A it is assumed that there is an identical unit at the remote terminal to which a call is being placed and that the two simultaneous messages which can be transmitted by the system will be received by the selected telephone set connected to upper channel and lower channel units 70' and 71' at the remote terminal of FIG. 6B by the PBX during the dialing hookup sequence. Since FIG. 6B is in this and all other respects identical with FIG. 6A, only FIG. 6A will be described and the corresponding elements in FIG. 6B will be assigned corresponding reference numerals primed.

Signalling between PBX's through a trunk circuit is normally accomplished by the E and M convention. The M lead transmits battery or ground signals to the signalling system. The E lead receives open or ground signals from the trunk. The near end condition of the trunk is indicated by the M lead and the far end condition by the E lead. These two leads on each end serve as the ON-OFF HOOK communication link via the trunk circuit.

A 2600 Hz single frequency inband signal is used for dial impulse transmission since the trunk circuit can be a carrier channel where DC cannot be transmitted. Thus upper channel unit 70 has E and M leads which are connected to a conventional single frequency generator 72 which produces the 2600 Hz signal on the outgoing line 73 to the trunk. The 2600 Hz signal on incoming line 74 is converted by the single frequency unit 72 to the appropriate E and M line conditions in upper channel unit 70.

The upper channel unit 70 receives the caller's voice signal on terminals XMIT which also receive the dual tone multifrequency (DTMF) dialing tones if the caller's set employs touchtone dialing. The XMIT terminals are passed directly through a switch 76X to a stacker 77 for application to the outgoing line 73. The alternate position of switch 76X applies voice signals to a speech compressor 78 operating with C=2 to reduce the frequency spectrum of voice signals by one-half.

The upper channel unit 70 has receiver (RCV) terminals which are connected to the receiver of the telephone set of the caller. These RCV terminals receive the voice signal from SF unit 72 appearing on output leads 75 after the voice signal passes through an unstack unit 79 and a VSC unit 81 operating with C=0.5 to expand the voice frequency signals by a factor of two. The signal from the unstacker 79 passes through a switch 76R which in the position shown in FIG. 6A bypasses the VSC unit 81 to avoid processing tone dialing signals and in the alternate position switch 76R receives the voice signals after frequency expansion in the unit 81.

The invention provides for a second simultaneous voice conversation over the same trunk line from a calling set which is connected to lower channel unit 71 with the voice signal applied to the XMIT terminals and the receiver connected to the RCV terminals of unit 71. As in unit 70, if the telephone set connected to unit 71 employs DTMF dialing, those phone signals are also connected to the XMIT terminals of unit 71. Either type audio signals connected to XMIT terminals in unit 71 pass through a switch connection 86X to SF unit 72 from which they are applied to the outgoing trunk line 73. In the alternate connection of switch 86X the XMIT signals pass through VSC unit 88 operating with C=2 to reduce the voice frequency spectrum by one-half.

The voice signal output on terminal 75 of unit 72 is applied directly to RCV terminals in unit 71 when switch 86R is in the position shown and for the alternate position of switch 86R voice signals from terminal 75 are expanded in VSC unit 87 operating at C=0.5 to double the frequency spectrum of the signals.

As previously explained for upper channel unit 70, the lower channel unit 71 has E and M terminals for impulse dialing which are connected to a single frequency unit 82 where the dialing impulses are converted to 2600 Hz and applied to a down-converter 81. Since the upper channel unit 70 is employing the normal 2600 Hz dialing impulses for E and M line dialing it is necessary to distinguish the dialing signals from the lower channel unit 71. This is accomplished in a down-converter 81 which receives the 2600 Hz signal on line 80 from single frequency unit 82 in the form of impulses as determined by the E and M lines of lower channel unit 71. The 2600 Hz input signals on line 80 to down-converter 81 appear on output line 83 as 1400 Hz impulses or tone indicating the condition of the E and M lines in lower channel unit 71. The 1400 Hz signals on line 83 are applied to the outgoing trunk line 73.

Incoming 1400 Hz signals from a remote lower channel 71' unit which are received on line 74 of the trunk line are applied by line 84 to an up-converter 85 where the 1400 Hz tone impulses are converted to corresponding 2600 Hz signals. These 2600 Hz signals from up-converter 85 are applied on line 89 to the SF unit 82 for indicating the condition of the called remote telephone set, i.e., ON HOOK or OFF HOOK. The SF to voice logic disables the 1400 Hz notch filter when voice transmission takes place.

The notch filter is necessary because during dialing by the caller, the SF from the far side is notched out so the caller cannot hear it. When the far side goes off hook to answer, the absence of the 1400 Hz on line 84 at the up converter 85 enables the SF to voice logic to bypass the notch filter for voice signals from the far side.

In the unmodified E&M to SF converter 82 where 2600 Hz tone dialing impulses are used, this function is already normally available.

The switching for signals in upper channel unit 70 is controlled in accordance with the condition of an AND circuit 91 which has as inputs the E and M leads of upper channel 70. Similarly the switching for signals of lower channel unit 71 is controlled in accordance with the condition of an AND circuit 92 which is determined by the inputs thereto from the E and M leads of lower channel unit 71.

Figure 7:
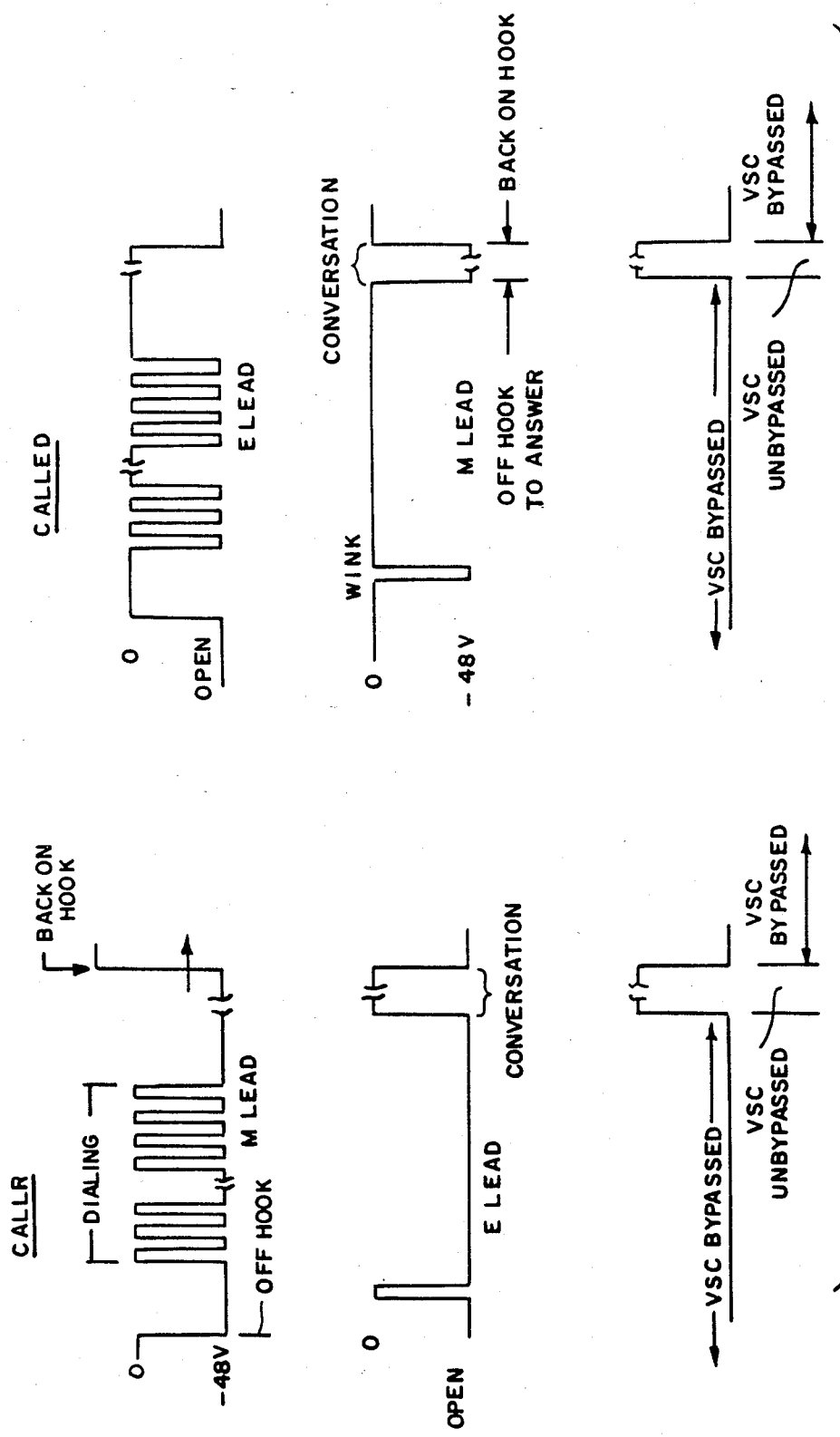
FIG. 7 shows the E and M convention for single frequency dialing for an ordinary dialed telephone connection with indication of when the voice compression and expansion circuits of the present invention would be in use or bypass during dialing.

As previously stated, all elements of the called station are equiped with corresponding structure and function and such a called station is illustrated in FIG. 6B with the elements numbered with primed reference characters corresponding to those used in FIG. 6A. The operation of the system to automatically dial a called number and transmit on only the upper half of the voice channel bandwidth will now be described. Consider FIGS. 6A and 6B interconnected by a trunk circuit 73, 74, and referring to the impulse dialing sequence of FIG. 7, the establishing of a voice circuit between a calling and a called set will be described. Assuming that the calling party is at the station of FIG. 6A and that the PBX has connected the calling telephone set to the terminals of upper channel unit 70. Referring to FIG. 7, the caller's M lead goes from 0 to −48 volts when the receiver goes OFF HOOK, and the dialing impulses are generated by the normal dial switch. The condition of M line in unit 70 is transmitted via the single frequency unit 72 to the called number at FIG. 6B where the switching of the M lead at the caller's station changes the E lead at the called station from open to 0, as indicated. The dialed number selects the circuit to the appropriate called telephone set in the usual manner, and when the called number goes OFF HOOK its M lead changes from 0 to −48 volts. Going OFF HOOK at the called set causes the E lead for the caller's set to go from open to 0. With the caller's M lead at −48 and the caller's E lead at 0, the connection is made to switch switches 76X and 76R to the alternate position from that shown in FIG. 6A and the conversation takes place until either the caller or called station goes back ON HOOK. During the conversation the VSC units 78 and 80 in FIG. 6A and VXC units 78' and 80' in FIG. 6B are not bypassed but are in operation.

Before both the caller and called sets are OFF HOOK the E and M line condition is transmitted on the 2600 Hz tone without modification by the VSC units but the upper channel 70 is frequency shifting by the STACK and UNSTACK 77, 79 units. After both sets are OFF HOOK and the alternate position of switches 76 occurs the transmission from XMIT in upper channel 70 is compressed in VSC unit 78 to half its spectrum width and is stacked in the upper half of the voice channel by STACK unit 77 before it is transmitted on outgoing line 73. At the receiving end in FIG. 6B the voice frequency signal stacked in the upper half of the channel bandwidth is incoming on line 73' and emerges from the SF unit 72' to be unstacked in unit 79' and have its frequency restored by the VSC expander 80' which doubles the frequency components of its input signal. The full frequency voice message thus reaches the RCV terminals of upper channel 70' of FIG. 6B from the VSC unit 80'. The reverse process occurs for voice messages originating at the XMIT terminals of upper channel unit 70' in FIG. 6B. Such signals are reduced in bandwidth by VSC compression unit 78' and stacked in the upper half of the channel bandwidth by STACK unit 77' for transmission on trunk line 74' to line 74 in FIG. 6A. The voice signals emerge from SF unit 72 at terminal 75 and they are unstacked at unit 79 and expanded in VSC unit 80 to produce a full frequency voice signal at the RCV terminals of upper channel unit 70.

Simultaneously with the OFF HOOK conversation occurring in the upper channel 70 as just described, a second voice message circuit can be achieved on the same trunk line 73, 74 using lower channel unit 71 and its associated circuits. Thus the PBX will assign the next call to lower channel 71 and the E and M dialing sequence will appear on the E and M leads of unit 71. The SF converter 82 converts the impulses to 2600 Hz tones and in this instance, since 2600 Hz is above the lower channel upper limit, a down-converter 81 converts the 2600 Hz impulse signals into 1400 Hz signals on line 83. These different frequency dialing signals are applied to the trunk line 73 which has a notch filter to eliminate the 1400 Hz tone from the conversation which is being conducted on the upper channel. The incoming 1400 Hz signal on line 73' of FIG. 6B passes through an up-converter 85' to restore the impulses to 2600 Hz on lead 89' so that the dialing impulses can pass through the SF unit 82' and be recognized by the normal telephone single frequency dialing equipment of the lower channel 71'. The reverse path from the E and M leads of lower channel unit 71' produce 2600 Hz from SF unit 82' which is down converted in unit 81' to 1400 Hz at line 83' for transmission on trunk line 74'. This 1400 Hz signal received on line 74 of FIG. 6A is applied to an up-converter 85 which converts the impulses to 2600 Hz at leads 89 where they are applied to SF unit 82 for normal operation with the E and M leads of lower channel 71. Again when both the calling and called sets are OFF HOOK for the lower channel the AND circuits 91, 92 and 91', 92' alter the switches 76, 86, 76', 86' to unbypass the VSC units. In the lower channel 71 the compression of the voice signal on XMIT terminals of lower channel unit 71 by a factor of two in unit 88 places the signal in the lower half of the channel bandwidth so that no stacking is required. Similarly in FIG. 6B the received signal is in the lower half of the channel bandwidth and only needs to be expanded in VSC unit 87' without unstacking to be restored to a full frequency voice signal at RCV terminals in lower channel unit 71'. The voice message originating at the set connected to lower channel unit 71' in FIG. 6B traces an analogous path back to the receiver RCV terminals of lower channel unit 71 in FIG. 6A with VSC compression for sending and VSC expansion upon reception, but without stacking or unstacking at either end of the line.

In the system disclosed in FIGS. 6A and 6B the speech compression and expansion and the stacking and unstacking are accomplished in the manner described herein with reference to FIGS. 1-4. Thus, referring to FIGS. 3 and 4, the upper channel of FIGS. 6A and 6B would correspond to channel B, while the lower channel of FIGS. 6A and 6B would correspond to channel A.

In the system of FIGS. 6A and 6B where DTMF touch tone dialing is used, such dialing tones are applied to the XMIT terminals of the calling station, such as upper channel 70 of FIG. 6A. The highest frequency used in DTMF dialing is 1477 Hz, hence the dialing tones in the upper channel are stacked in unit 77 to transmit tones equal to $(3200-F_{DTMF})$ which is the lower sideband when the input signal is applied for stacking in the system of FIG. 1. When these stacked dial tones are unstacked in unit 79' of FIG. 6B they are applied directly to the RCV terminals without VSC conversion, since the OFF HOOK condition has not yet occurred, and when unstacked, they are reconverted into their normal dual tone frequencies of the touch tone dialing system. For a call originating on lower channel unit 71 using DTMF dialing the dual tones are all within the lower channel and can be transmitted directly without VSC conversion and without stacking or unstacking to receiver terminals RCV in lower channel unit 71 of FIG. 6B. At each end of the line SF units 72 and 72' process the OFF HOOK condition to supply the signals to AND circuits 91, 92, 91', 92' for the necessary switching to unbypass the VSC during OFF HOOK voice messages.

Figure 8:
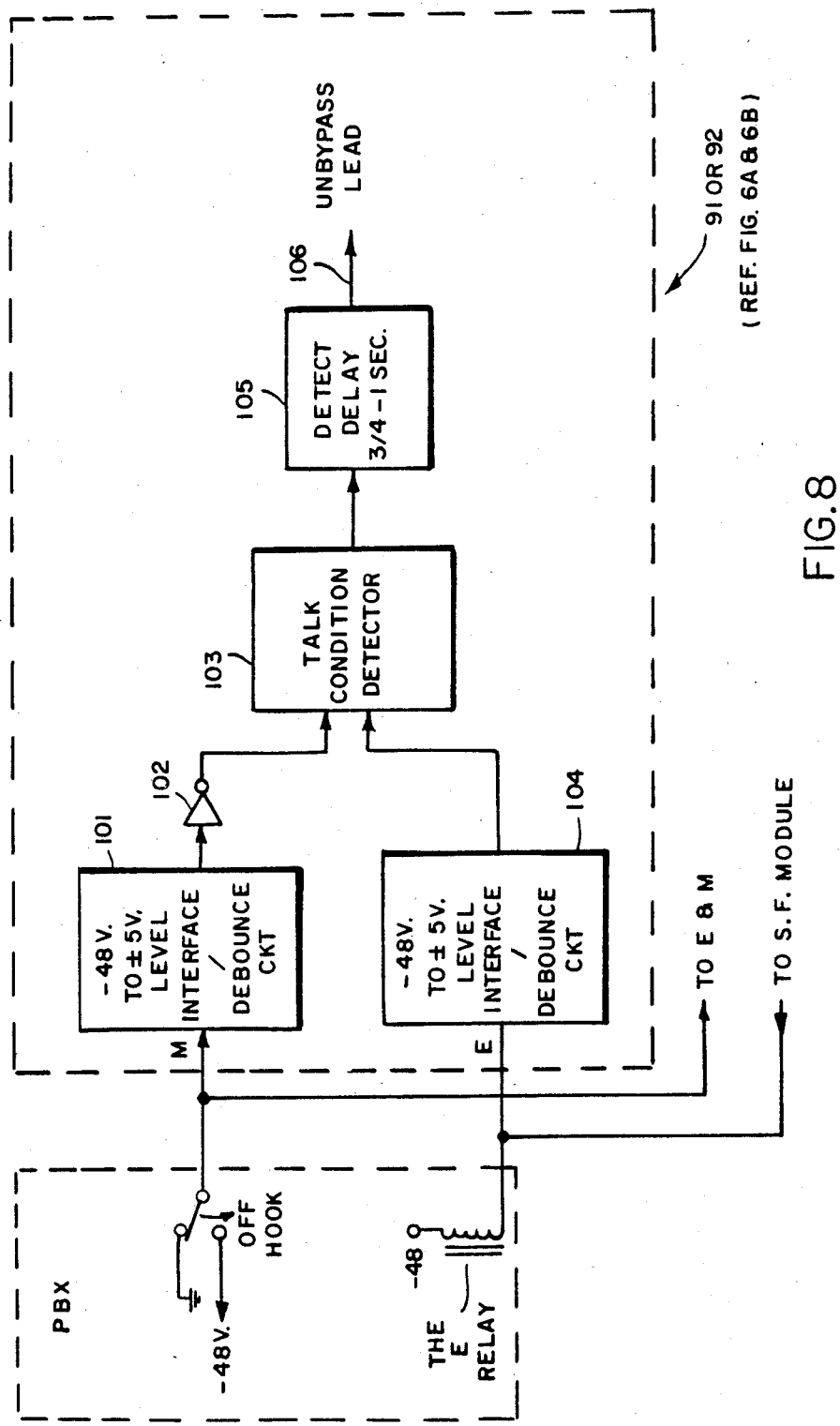
FIG. 8 is a block diagram of the unbypass logic for switching a dialed connection to stacked transmission condition.

Further details of the switching to unbypass the VSC units in FIGS. 6A and 6B will be described with reference to FIG. 8. As previously described upon going OFF HOOK the calling PBX switches the M lead from ground to −48 volts. As shown in FIG. 8, this OFF HOOK condition of the calling set is applied on the M lead to a level interface and debounce circuit 101. Where the switched levels are converted to ±5 volts and applied through an inverter 102 to a talk condition detector 103. The E lead of the calling station is normally open for the ON HOOK condition and goes OFF HOOK (winks) to signal the called end is ready to receive dialing information. When the E lead is open the −48 volts is applied to the relay winding in the PBX thus de-energizing it and creating the E signal for the calling end. A level interface and debounce circuit 104 converts the −48 to ground signal on the E lead into ±5 volts which is applied directly to talk condition detector 103. When the talk condition detector 103 senses the OFF HOOK condition for both the E and M circuit its output goes high and this output is fed to a detect delay circuit 105 which provides approximately a one second delay to prevent the VSC from being unbypassed by the wink back signal. After this delay the output of detect delay 105 operates the unbypass switching to the VSC units 91, 92 and 91', 92' of FIGS. 6A and 6B by its output signal on lead 106. The called end of the circuit, by going OFF HOOK unbypasses VSC for both ends by creating OFF HOOK conditions on the E&M leads on both ends.

Referring to FIG. 9 the dialer low channel transmit SF up converter will be described. A 1400 Hz signal is generated in a 1400 Hz oscillator 110 and fed to a tone gate circuit where the 1400 Hz signal is gated on and off and adjusted to the level of the input SF tone. The output of the tone gate 111 is then passed through a low pass filter 113 to provide a sine wave in line 83 of FIG. 6A.

The transmit 2600 Hz SF signal on line 80 is detected by a PLL tone detector 114 and a debounced logic output is used to control the tone gate 111 as follows. The SF is amplified in amplifier 115 and fed to an envelope detector 116 and level detector 117 to develop a logic signal representing the high SF tone level. These two logic signals from tone detector 114 and SF level detector 117 are used in the tone gate circuit 111 to gate the 1400 Hz SF signal on and off at output line 83 and adjust its level to follow the input SF tone on line 80. The SF is a supervisory signal during ON HOOK condition. It is generated at the E&M to SF module by presence of the ground condition of the M lead. When the caller goes OFF HOOK, the SF goes from a −20 dbm level (during ON HOOK) to no SF (excess of −100 dbm). During dialing, the pulsing of the "M" lead causes the turning on of the SF to a level of −8 dbm (12 dbm higher than the supervisory level).

Referring to FIG. 10, the dialer low channel receive SF down converter will be described. The low channel receive signal which contains both voice and SF information is fed to the input of this circuit on line 84. To reduce the possibility of voice signals being mistakenly recognized as SF, an ANTI TALK OFF circuit 121 is employed. The signals on line 84 are first separated by means of a high pass filter 122 for the SF tone and low pass filters 123, 123', in the ANTI TALK OFF circuit. A logic signal is produced by a tone detector 125 whenever 1400 Hz. is present at the proper level. The voice signal is squared up in detector 126 and the positive edges used to trigger a retriggerable monostable 127 providing a more distinct indication of the presence of voice. The two logic signals are then fed to a SF tone detect logic 128 where they are used to provide an SF detected signal to turn a tone gate 129 on and off.

The output of a 2600 Hz oscillator 131 is fed to the tone gate 129 where it is turned off and on by the SF detect logic signal and the level adjusted by the level detection circuits 132 and 133 similar to units 116 and 117 previously described. The gates SF 2600 Hz tone is then passed through low pass filters 134, 134' to provide a sine wave output on line 89 which follows the input SF tone level.

Variations of the invention will occur to those skilled in the art from the present disclosure. Although voice messages are the norm and are mentioned as such in this disclosure, it will be understood that the system operates with any analog signals within the voice frequency band of the system. The invention accordingly is to be considered as not limited to the disclosed or suggested embodiments but only by the scope of the appended claims.

I claim:

1. A terminal for two way telephone communication of two voice messages over a single voice circuit comprising;

first and second transmitting voice channel input terminals;

first and second speech compressors coupled respectively to said input terminals for reducing the spectrum of the voice signals in each channel to the lower half of the bandwidth of said voice circuit;

a first carrier frequency oscillator for supplying a first high frequency relative to the voice spectrum;

first balanced modulator means for modulating said first carrier frequency with the compressed voice signal of said second channel and producing a first supressed carrier side band output;

means for selecting the lower side band of said output;

means for generating a second carrier frequency offset by the bandwidth of said circuit from said first carrier frequency;

first balanced demodulator means responsive to said lower sideband output and said second carrier frequency to produce the compressed voice signal of said second channel offset by half the bandwidth of said circuit;

means for selecting said lower side band offset in the upper half of said circuit bandwidth;

means for summing the lower half bandwidth compressed voice signal in said first channel with the offset compressed voice signal of said second channel in the upper half bandwidth to provide an output signal of the combined upper and lower half bandwidth signals to an output terminal;

means for coupling the combined signal to said voice circuit;

a receiving voice circuit input terminal;

a bandpass filter for passing signals in said upper half bandwidth;

a lowpass filter for passing signals in said lower half bandwidth;

means coupling said receiving voice circuit input terminal to the inputs of said bandpass filter and said lowpass filter;

second balanced modulator means responsive to the output of said bandpass filter and said second carrier frequency for producing a second supressed carrier single sideband signal offset above said second carrier by half said voice circuit bandwidth;

means for selecting said offset single side band signal from said second modulator;

second balanced demodulator means responsive to said second suppressed carrier selected single sideband signal and said first carrier frequency for producing said upper half bandwidth signal as a sideband at said second carrier;

means for detecting said sideband of said second carrier at baseband; and first and second speech expanders coupled respectively to the outputs of said lowpass filter and said detected baseband output to produce separate baseband voice spectrum signal outputs from the upper and lower half bandwidth signals coupled to said input terminal.

2. An adapter for dialed telephone network calls that provides for two simultaneous calls in a single voice frequency channel comprising:

two groups of terminals providing individual connections to first and second telephone sets, each telephone set including a transmitter, a receiver and E and M dialing lines;

outgoing and incoming line terminals;

means for spectrum compressing voice signals from each of said transmitters to half the voice channel bandwidth and for stacking the compressed voice signal of said first set to occupy the upper half of said bandwidth;

first frequency converting means for converting E and M line status and dial impulses from said first set into single frequency signals in the upper half of said bandwidth;

second frequency converting means for converting E and M line status and dial impulses from said second set into single frequency signals in the upper half of said bandwidth;

a down-converter for converting the frequency of the output of said second single frequency converting means to a predetermined frequency within the lower half of said bandwidth;

means for coupling the outputs of said first single frequency means and said down-converter to said outgoing line terminals to be transmitted over said channel;

means for unstacking and spectrum expanding voice signals in the upper half of said bandwidth and passing the resulting voice signal to the receiver of said first set;

second means for expanding voice signals in the lower half of said bandwidth and passing the resulting voice signal to the receiver of said second set;

means for coupling signals received from said incoming line terminals to said first single frequency means and responsive to signals in the upper half of said bandwidth for determining E and M status of a called number connected to said first set and for passing voice signals for connected calls to said unstacking and expanding means, and operable to pass voice signals in the lower half of said bandwidth to said second expanding means; and an up-converter for converting incoming line signals at said predetermined frequency into output signals at said single frequency and applying said output signals to said second frequency converting means for determining E and M status of a called number connected to said second set and for passing voice signals for connected calls to said second expanding means.

3. Apparatus according to claim 2 adapted for dual tone multifrequency (DTMF) dialing comprising in addition:

means for applying respective DTMF tones as dialed to the transmitter terminals in each set;

means responsive to local off hook condition prior to completion of a call for bypassing signals around said spectrum compressing and both expanding means; and means responsive to completion of a call for unbypassing the compressing and both expanding means for the voice signals of the sets which have connected with a called number.

4. The method of dialing a plurality of independent calls through a trunk line having predetermined bandwidth prior to adapting said line for carrying a like plurality of frequency compressed and offset stacked messages comprising the steps of:

subdividing the trunk line bandwidth into a plurality of contiguous frequency sub-channels with stacker terminals;

assigning each originating trunk line call from a plurality of sets to an individual one of said sub-channels;

converting as required single frequency tone dialing impulses from any set to a frequency within the sub-channel assigned for that particular call;

responding to an answering signal from a called set which is selected by dialing impulses from a sub-channel to condition the stacker terminals at that sub-channel for two-way voice transmissions by converting local telephone set voice messages through frequency compression and offset stacking to utilize the bandwidth of the line for multiple simultaneous message transmission; and unstacking and expanding compressed voice messages received in said sub-channel to normal voice frequency range signals applied to the receiver of said set.

5. In a dialed telephone network which uses the E and M line convention and single frequency dialing impulses an adapter which permits two telephone conversations to occur simultaneously over a single trunk line comprising:

input couplings for an upper channel telephone set and a lower channel telephone set;

an output coupling to said trunk line including transmit, receive and single frequency E and M status lines;

means for frequency compression of voice frequency signals originating at said two sets and stacking the compressed signals into upper and lower channels to occupy the trunk line bandwidth;

means for applying said compressed stacked signals to said transmit line;

means for unstacking signals received on said receive line and to obtain separate upper and lower channel signals;

means for frequency expansion of said separate upper and lower channel signals to normal voice frequency signals applied to said upper and lower channel sets respectively;

means for translating the single frequency dialing impulses originating from the lower channel set into a predetermined frequency in the lower half of said line bandwidth and applying it to said transmit line; and means for translating dialing impulses received on said receive line at said predetermined frequency to said single frequency and applying such dialing impulses to said lower channel;

whereby dialing impulses originating in said upper and lower channel sets are operative to select connection to a corresponding upper or lower channel set respectively at a called end of the trunk line and said upper and lower channel voice frequency signals can be transmitted at the same time.

6. Apparatus according to claim 5 adapted for dual tone multifrequency dialing which includes logic means for bypassing said means for frequency compression and said means for frequency expansion during dialing and unbypassing said frequency compression and frequency expansion means in each channel respectively upon completion of a circuit to a telephone set at the called end of the trunk line.

* * * * *